July 18, 1933.  E. T. WILLIAMS  1,918,947
SECONDARY BATTERY
Filed Sept. 21, 1929
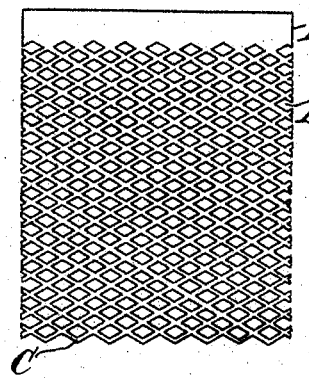
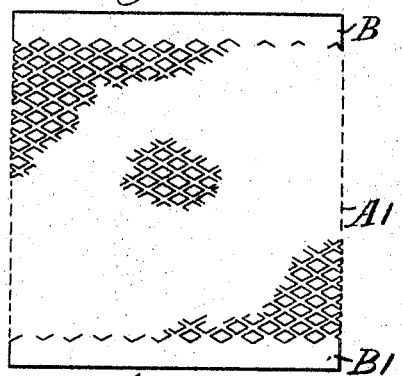
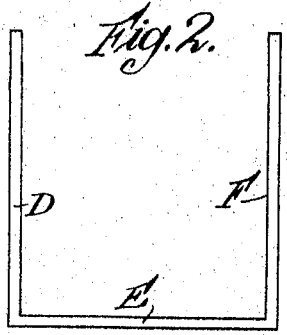
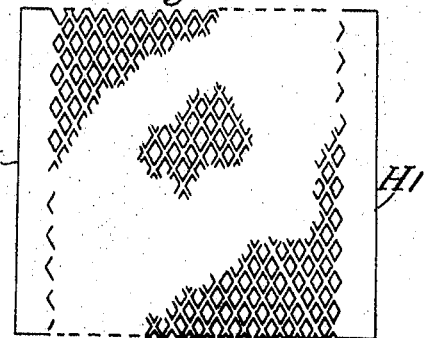
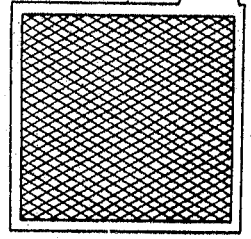
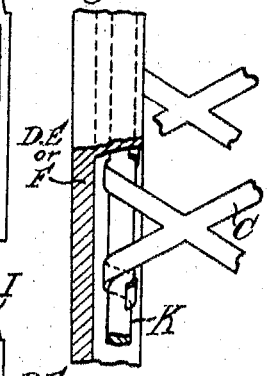
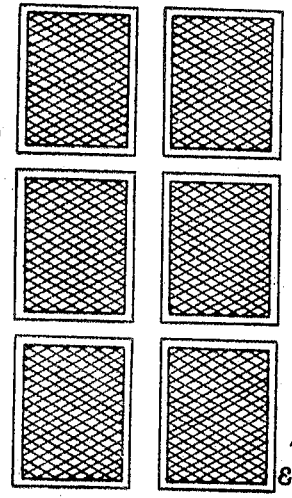
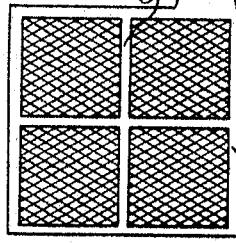
INVENTOR
E. T. Williams
BY
Baldwin & Wright
His ATTORNEYS Patented July 18, 1933

1,918,947

UNITED STATES PATENT OFFICE

ERNEST THOMAS WILLIAMS, OF GOLDERS GREEN, LONDON, ENGLAND

SECONDARY BATTERY

Application filed September 21, 1929, Serial No. 394,224, and in Great Britain October 13, 1928.

This invention relates to electric accumulators and more particularly to the construction of the grids or equivalent structures employed in such accumulators to support or act as the base of the active material.

The invention has for its main objects to provide a construction of grid which shall be capable of giving long service without substantial physical or chemical deterioration in use, and which shall be strong, durable and well adapted to retain its active material under the effects of vibration.

These advantages follow in part from the fact that grids in accordance with this invention can be made readily and satisfactorily from worked, (e. g. rolled) lead which may have a smaller antimony content than is customary with the usual cast grids and which does not present the mechanical, physical and chemical disadvantages attendant upon the use of the materials of which such cast grids are made at the present time.

According to this invention, a grid or equivalent active material carrying structure of an accumulator is constituted by one or more sheets of expanded lead or lead alloy. The said sheet or sheets may be, if desired, supported or contained by a substantially rigid framework, which may be of cast but is preferably of extruded, rolled or solid drawn lead or lead alloy wire, rod, ribbon, tape, plate or bars, whereby the completed element for the accumulator has the required degree of stiffness.

The accompanying drawing illustrates a number of typical ways of carrying the invention into practice.

Figure 1 shows one form of an expanded sheet with an unexpanded portion at the upper end. Figure 2 shows a frame to receive the free ends of the expanded sheet. Figures 3 and 4 show alternative forms of expanded sheets. Figure 5 shows a complete grid. Figure 6 illustrates either a complete single piece grid with stiffening or supporting cross ribs or a grid built up from a number of smaller elements. Figure 7 represents how a large grid made up from a number of smaller completed grids. Figures 8 and 9 show diagrammatically in part sectional elevation and sectional plan one method of reinforcing the edge members for a sheet of expanded metal.

In the form illustrated in Figure 1, a sheet A of expanded lead or lead alloy has a plain unexpanded portion B and an expanded portion C. The sheet A is adapted to be enclosed in a channel work frame of lead or lead alloy D, E, F, (Figure 2) to enclose the expanded edges. This frame may be pressed on over the edges of the expanded portion C, and/or may be rivetted, burnt or welded on to it, or the frame can be cast around the edges of the expanded portion. The piece B may be doubled over on itself and any lugs desired may be welded or burnt on to it, or the piece A may be cut so as to include any desired lugs or the like as part thereof. Two or more plates similar to the plate A may be used, one being superimposed on the other so that preferably the mesh of metal of one plate is opposite the openings on the other. The plates may then be enclosed in the frame D, E, F. The portions B of the plates may be burnt or welded together on the edges and dealt with as described above for the single plate for providing the lugs &c. Where the frame D, E, F meets the portion B it may be burnt or welded to it, and any lugs or protrusions may be provided on frame D, E, F as necessary.

In the form illustrated in Figures 3 and 4 a sheet A1 (Figure 3) of expanded lead or lead alloy has plain unexpanded portions B and B1, and a second sheet G (Figure 4) has unexpanded portions H and H1. The meshes in the sheets may be arranged as shown or at any other desired angles. The sheet G is superimposed on the sheets A1 and the unexpanded portions of sheet A1 are folded over the expanded edges of sheet G, while the unexpanded portions of sheet G are folded over the expanded edges of sheet A1. The edges of the plates are then pressed together, and burnt, welded or rivetted or otherwise similarly treated as desired.

If desired the frame at the edge of the assembled sheets may be cast by placing the assembled sheets in a mould and running in the molten lead or lead alloy. Again the frame at the edges may be reinforced by rods, bars, wires, meshes or the like by assembling the reinforcement about the edges before joining the frame or by using reinforced bars or the like for the frame members.

Figure 5 shows one form of the complete element with framing and lug I complete.

In Figure 6, intermediate ribs J, J1 are shown connecting the edge framing members. These ribs in addition support or stiffen the expanded sheet or sheets.

Figure 6 can be read also to illustrate a grid, plate or the like made up of a number of small elements connected by the ribs J, J1.

A large grid can be made up as shown in Figure 7 from a number of complete elements formed as above described which can be united by burning or casting and the said large grid may be provided with strengthening rods or bars arranged intermediate to the frame members at the edges, similarly to that shown in Figure 6, so as to support the grid sections at other places than the outside edges. These strengthening or supporting members may of course be formed as part of the framing or may be cast, burnt, pressed or riveted on after the large grid has been assembled.

A single grid may comprise one or more layers of expanded sheet in one frame, or it may comprise a plurality of frames, each with one or more expanded sheets joined together to form one grid. Where one or more layers of expanded sheet are used it is usually desirable to arrange that the spaces on one sheet should be opposite the metal work of the other sheet or mesh.

The frame members of the grids, plates or the like can be reinforced as shown in Figures 8 and 9 by rods K. In the form illustrated the edges of the expanded sheet C are bent around the rods, and the edge framing members such as D, E, or F suitably formed thereon so as to provide a reinforced edging.

Insulating spacing pieces may be moulded on to the grid, frame, etc. or may be incorporated in the skeleton frame. The purpose of these insulators is to keep one plate from touching its opposite plate when assembled.

It will readily be appreciated that the invention is applicable alike to secondary batteries of the Faure and of the Planté type.

In the former case the active paste is pressed into the meshes of the expanded metal and is very firmly held or keyed thereon by virtue of the well known special shape which the angular diamond like meshes of expanded metal have. In the latter case the prepared plate or grid of plates is subjected to the usual process of rapid and continuous charging and discharging to "form" the active material on the lead.

Accumulators made in accordance with this invention have a number of important practical advantages. Firstly, the use of expanded metal for the base of the grids results in a mechanically robust structure, since the active material is carried upon or formed upon a strong base which will not readily release the said material even under the effects of vibration. Again, the surface area of the resultant plates is very substantial, an advantage of considerable importance in the case of Planté type accumulators, and one which makes for efficiency in any case. It will be noted, moreover that the invention renders it possible to construct a practical and sturdy accumulator grid of lead having a very small content of antimony and/or other metals. In most known constructions, cast grids have been employed, and, as is well known, in such constructions it has for practical reasons been thought necessary or desirable for the lead to have a considerable content of antimony, generally of the order of say 7% to 12% or 13%. Plates in accordance with this invention may, if desired be made of lead having an antimony content in the neighbourhood of 2.7% only and such plates have been found in practice to have very substantial advantages. Again the use of casting for essential active material-carrying portions of the plates is avoided, and it will readily be appreciated that the worked expanded sheet construction utilized according to the present invention is mechanically stronger and less porous and more stable than cast material; indeed, by using a solid drawn alloy, rolling it and then expanding it, very great mechanical stability can be obtained.

Having now particularly described and ascertained the nature of my said invention and in what manner the same is to be performed, I declare that what I claim is:—

1. An electrode grid for batteries having two grid members, each grid member being of a sheet of expanded metal having relatively solid edge portions in parallelism, the meshes of the expanded metal extending to the other edge portions of the members, said members being superimposed with the solid edge portions of the different members at a right angle to each other, and each solid edge portion being extended over the adjacent edge and remote side of the companion member.

2. In an accumulator plate, a grid for supporting the active material, said grid consisting of a sheet of expanded lead whose material-receiving meshes are substantially of diamond shape, and active material keyed in the meshes by the peculiar shape of the meshes.

3. In an accumulator plate, a grid substantially of expanded lead with a low antimony content, active material keyed in the meshes of the grid by the peculiar shape thereof, and an outer frame for said grid of a conducting metal more rigid than the material of the grid.

4. In an accumulator plate, a grid of expanded metal whose principal constituent is lead, active material keyed in the meshes of the grid by the peculiar shape thereof, and a rigid outer framework integral with said grid.

5. A secondary battery having a plate consisting of a plurality of superimposed sheets of expanded metal whose principal constituent is lead, active material keyed in the meshes of the grid by the peculiar shape of the meshes, and an outer framework for said sheets more rigid than the sheets and securing them together.

6. In an accumulator plate, a grid of expanded metal whose principal constituent is lead, active material keyed in the meshes of the grid by the peculiar shape of the meshes, said grid having an outer framework more rigid than the grid, and intermediate reinforcing members for the grid connected to the framework.

7. A secondary battery plate grid consisting of a sheet of expanded lead having active material keyed in its meshes by the peculiar shape of the meshes.

8. A flat secondary battery plate grid consisting of a sheet of rolled solid drawn expanded metal which is a conductor of electricity, having active material keyed in its meshes by the peculiar shape of the meshes.

9. A battery plate grid consisting of a sheet of expanded lead, and active material carried by the grid on the portions of the grid at the meshes thereof.

10. A battery plate grid consisting of a sheet of expanded conducting metal, and active material carried by the grid on the portions of the grid at the meshes thereof.

ERNEST THOMAS WILLIAMS.